J. H. HENDRICKS.
Bee Hive.
No. 51,716.
Patented Dec. 26, 1865.
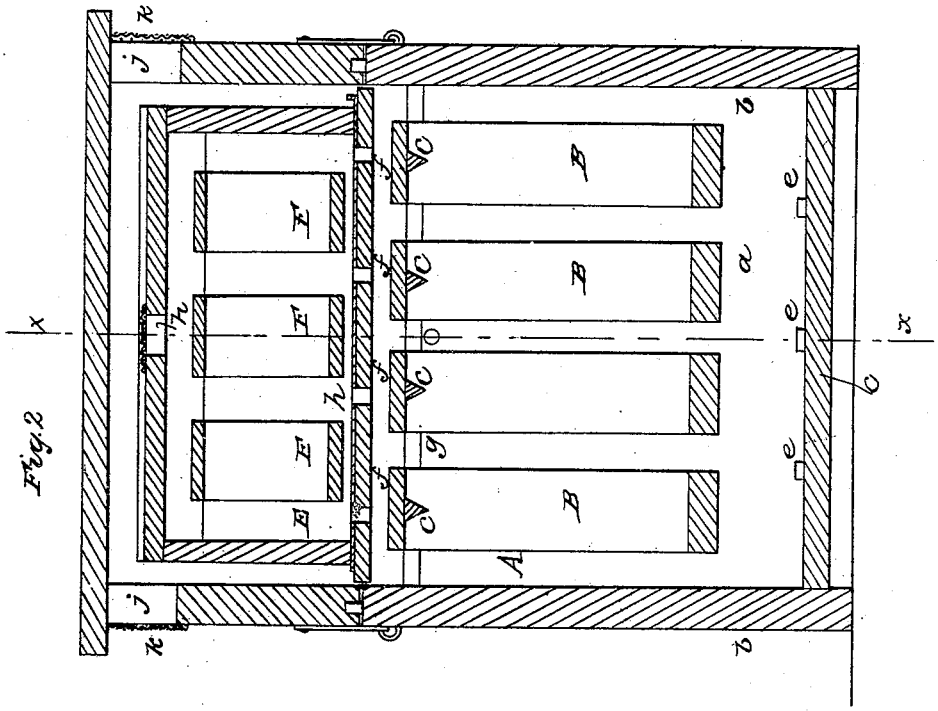
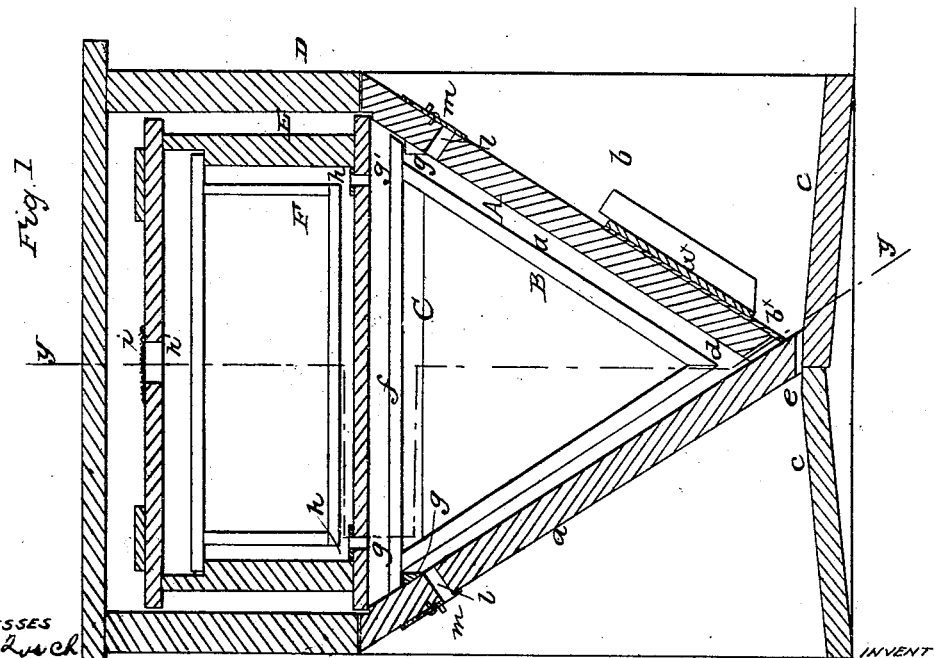

UNITED STATES PATENT OFFICE.

JOHN H. HENDRICK, OF CLINTON, ILLINOIS.

IMPROVEMENT IN BEE-HIVES.

Specification forming part of Letters Patent No. 51,716, dated December 26, 1865.

*To all whom it may concern:*

Be it known that I, JOHN H. HENDRICK, of Clinton, in the county of De Witt and State of Illinois, have invented a new and Improved Bee-Hive; and I do hereby declare that the following is a full, clear, and exact description thereof, which will enable those skilled in the art to make and use the same, reference being had to the accompanying drawings, forming part of this specification, in which—

Figure 1 is a vertical section of my invention, taken in the line $xx$, Fig. 2; Fig. 2, a vertical section of the same, taken in the line $yy$, Fig. 1.

Similar letters of reference indicate corresponding parts.

This invention consists in a novel arrangement of the alighting-boards and side pieces admitting entrance to the hive from either direction.

A represents the body or main portion of the hive, the front and rear sides $aa$ of which are inclined, forming a V in its transverse section, as shown clearly in Fig. 1. The other two sides or end pieces, $bb$, are square, and have two inclined strips or boards, $cc$, attached to their lower ends to form alighting-boards, one of the inclined sides $a$ being attached to the inner ends of the inclined strips $cc$ at their junction. The end pieces, $bb$, inclose the alighting-boards $cc$ at their sides, which greatly aid the bees in entering the hive, especially when laden with honey during windy weather.

The bee-entrance $d$ is at the lower end of the inclined side $a$, which does not extend down to the alighting-boards $cc$, and the bees may enter the hive from either board $c$ by having holes $e$ in the lower part of the inclined side $a$, which extends down to the alighting-boards. This entrance is provided with a slide, $a^x$, having a perforated plate, $b^x$, attached, to shut in the bees and still admit air.

Within the hive A there are placed a series of comb-frames, B, which are of triangular form, and have the ends of their upper bars, $f$, resting on cleats $g$, attached to the inner surfaces of the front and rear sides of the hive. A space is allowed between these comb-frames, and also between their lower ends and sides and the sides of the hive, so that the bees cannot connect the combs to each other nor to the sides of the hive, and to insure the bees building the combs vertically within the frames B triangular or V-shaped strips C are attached to the under surfaces of their top bars, $f$.

The hive A is provided with a box, D, of rectangular form, within which a smaller box, E, is placed, containing comb-frames F. A suitable space is allowed between the two boxes D E, and the bottom of the box E is perforated with holes $g'$, over which perforated slides $h$ are placed, by adjusting which the holes $g'$ may be opened and closed and the bees admitted to the box E and cut off from it, when desired. The box E has an opening, $h'$, in its upper end covered by wire-cloth $i$, and openings $j$ are made in two opposite sides of the box or cap D, said openings being covered with wire-cloth $k$, and openings $l$ are also made in the upper parts of the inclined sides $aa$, the latter openings being covered by valves $m$, consisting of circular plates, with holes of different dimensions made in them to regulate the admission of air. By this arrangement the hive may be kept in a perfectly ventilated state and also in a dry state, while the inclined sides and triangular comb-frames cause the bees in winter to be quite close together in a compact mass, so that the animal heat will keep them sufficiently warm.

Having thus described my invention, I claim as new and desire to secure by Letters Patent—

The perforations $e$ at the lower part of one of the side pieces, $a$, of the hive when used in connection with the alighting-bands $cc$, end pieces, $bb$, and inclined sides $aa$ of the hive, and the bee-entrance $d$, all arranged substantially as and for the purpose set forth.

JOHN H. HENDRICK.

Witnesses:
PHILIP CLARK,
JOSEPH R. WOLFE.